United States Patent [19]
Vallicella

[11] 3,964,244
[45] June 22, 1976

[54] TREE SHAKER AND FRUIT AND NUT HARVESTER

[76] Inventor: Rolando M. Vallicella, Rte. 2, Box 562, Bakersfield, Calif. 93307

[22] Filed: Dec. 30, 1974

[21] Appl. No.: 537,251

[52] U.S. Cl. .............................. 56/329; 56/328 TS
[51] Int. Cl.² ......................................... A01D 46/24
[58] Field of Search ....................... 56/328 TS, 329

[56] References Cited
UNITED STATES PATENTS

| | | | |
|---|---|---|---|
| 3,608,292 | 9/1971 | Perry | 56/329 |
| 3,683,617 | 8/1972 | Vallicella | 56/329 |
| 3,706,187 | 12/1972 | Toet | 56/329 |

*Primary Examiner*—J.N. Eskovitz
*Attorney, Agent, or Firm*—William C. Babcock

[57] ABSTRACT

A combined tree shaker and fruit and nut harvester of such width as to be movable longitudinally in the spaces between trees having the trunks arranged in rows. The harvester includes a transversely movable carriage that supports power-driven shaker means, a pair of conveyors, and expandable deflector means, with the deflector means being expandable under trees having low-hanging branches, and the power-driven shaker means capable of removably engaging either straight or angularly positioned trunks.

7 Claims, 18 Drawing Figures

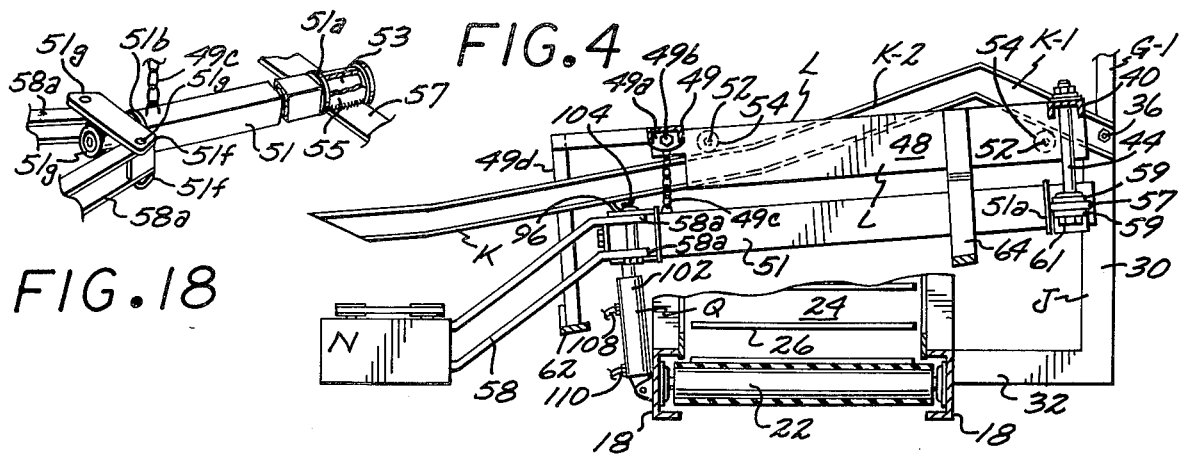
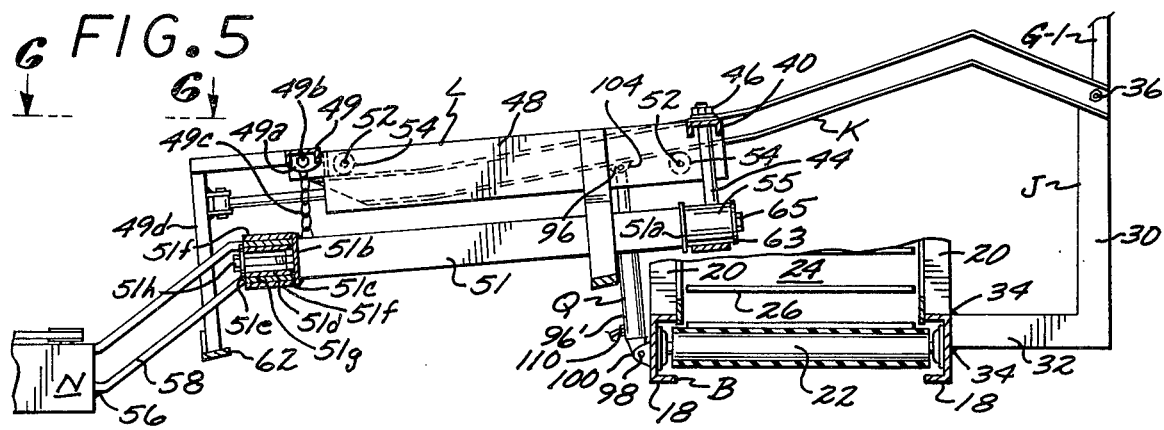
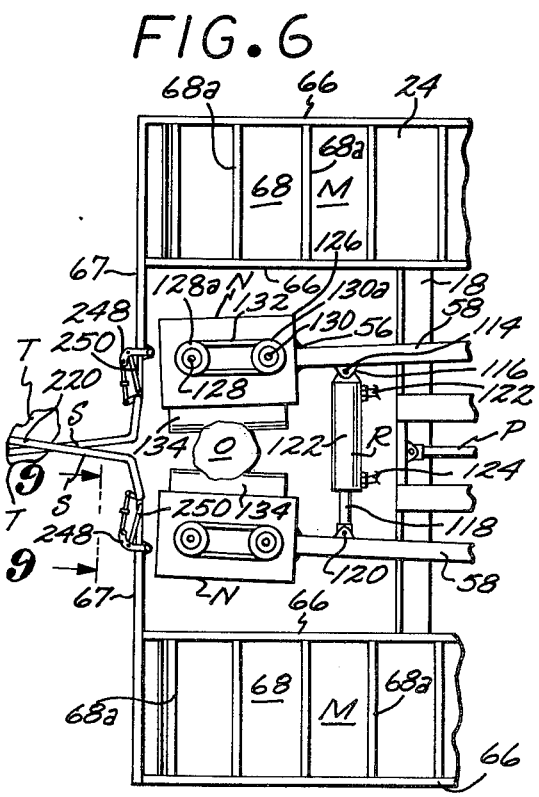
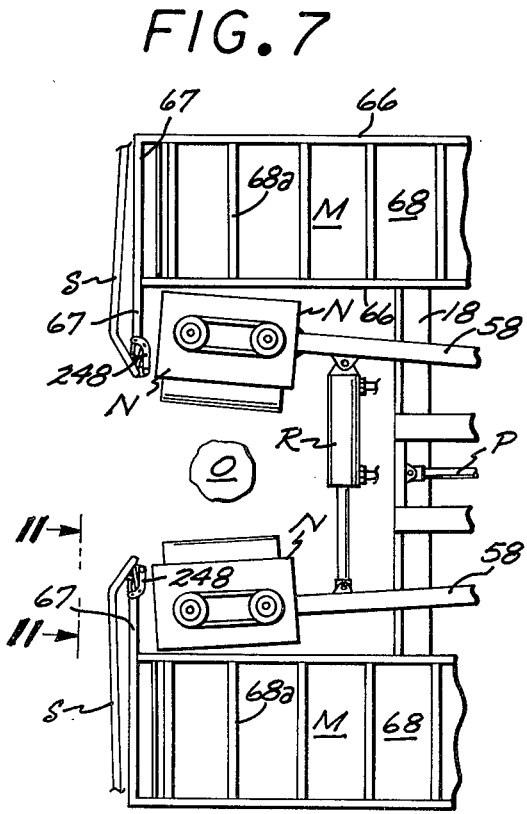

TREE SHAKER AND FRUIT AND NUT HARVESTER

BACKGROUND OF THE INVENTION

1. Field of the Invention

Combined tree shaker and fruit and nut harvester.

2. Description of the Prior Art

The present invention is an improvement of the combined tree shaker and fruit harvester disclosed and claimed in U.S. Letters Pat. No. 3,683,617 that issued to the present application Rolando M. Vallicella 15, 1972.

The present tree shaker and harvester has the operational advantages over the device disclosed and claimed in the above identified patent, in that, the present invention the shakers may be laterally separated a far greater distance than possible with those in the prior device, and as a result a minimum of accuracy is required in transversely aligning the present invention with the trunk of a tree prior to the shakers being placed in gripping contact with the tree trunk thereof. Also, the present invention permits the shakers to be moved transversely as well as downwardly relative to the chassis of the harvester, and as a result, the shakers may be extended under low hanging branches to engage the trunk of a tree which would not be possible with applicant's prior tree shaker and harvester.

The present invention also includes a novel pivotal support for the expandable deflector means, which deflector means in combination with a fixed deflector provide the surface on which the harvested nuts or fruit fall. The expandable deflector means in the present invention are expanded after they have been disposed under the low hanging branches of a tree, with the expanding operation being accompanied by pivotal movement of two sets of supports for two sheets of pliable material, and this pivotal movement occurring as the supports of the two sets move towards one another.

The primary object in devising the present invention is to supply a combined tree shaker and fruit and nut harvester that is succeptible to numerous modifications, and to provide one that is particularly adapted to use in the harvesting of fruit and nuts from trees having low hanging branches.

SUMMARY OF THE INVENTION

A device that is power operated and may be moved longitudinally along a space between trees that have the trunks thereof arranged in rows to sequentially subject each of said trees, including those with low hanging branches to a shaking operation to displace fruit or nuts therefrom, to harvest the fruit or nuts shaken from the tree, and to deliver the fruit or nuts to a container that travels with the device. The device includes an elongate power driven wheel supported, manually guidable chassis having first and second ends, and an elongate dimensionally stable first fruit and nut deflector longitudinally supported on the chassis and extending under a portion of the branches of a tree when the chassis of the invention is in a harvesting position relative to the tree.

A first longitudinal conveyor belt assembly is supported on the chassis under the deflector and a transversely movable carriage is disposed between the deflector and the first conveyor belt assembly. The carriage is capable of occupying either first or second positions, with the carriage when in the first position extending across the first conveyor belt assembly and the carriage when in the second position extending outwardly from the first conveyor belt assembly towards the tree that is to be harvested.

Two longitudinally spaced transverse, elongate rigid members having first and second ends are pivotally connected to the carriage, and two power operated tree shakers are supported from the second ends of the members. Two longitudinally spaced transverse frames are supported from the carriage, with the two members situated between the frame. The longitudinal spacing between the transverse frames is such that the two members and tree shakers supported therefrom may be angularly disposed away from one another when the shakers are not in a tree trunk engaging position, the frames have outwardly disposed longitudinally extending first ends, and the frames support two conveyor belt assemblies within the confines thereof.

First power means are provided for moving the carriage between first and second positions, second power means are also provided for pivoting the elongate members towards one another to dispose the tree shakers in gripping contact with the trunk of the tree. Third power means are provided for driving the first and second conveyor belt assemblies. Two expandable sheet deflectors that may be extended under a tree to cooperate with the first deflector to receive nuts and fruit taken from the tree are provided, and when expanded by being pivoted and concurrently moved towards one another define fruit and nut receiving surfaces that slope towards the second conveyor belt assembly. Fruit or nuts falling on the surfaces of the expanded deflector move by gravity to the second conveyor belt assemblies where they are transported to the first conveyor to move towards the first end of the chassis. The fruit or nuts that have been harvested and are conveyed to the first end of the chassis are delivered to a container that moves concurrently with the vehicle.

One of the improvements of the present invention over the applicant's prior patent previously identified is that the expandable sheet deflectors can be extended under trees with low hanging branches to receive fruit or nuts therefrom when the shakers are in gripping contact with the trunk of the tree are actuated. Another improvement in applicant's present invention is that it includes two transverse, longitudinally spaced, rails supported in an elevated position above the chassis and the first conveyor belt assembly thereon, with the rails having upwardly inclined first portions above the first conveyor belt assembly and downwardly inclined second portions. Roller means are provided on the carriage that movably engage the rails and support the carriage therefrom, and the rollers on at least a portion of the journey as the carriage moves from the first to the second position being in engagement with both the first and second rail portions to cause said shakers as they initially move transversely relative to the chassis to move downwardly at a substantial angle to pass under low overhanging branches of a tree and as said journey continues the shakers continue to move downwardly but at a less angle as the roller means rest entirely on the second portions of the rails.

A further improvement is that two longitudinally extending slides are movably supported from the first ends of the frames that support the two second conveyors. Two elongate first supports of angular shape are pivotally mounted on the slides, with the supports having free edges of the expandable sheet deflectors being secured thereto. Linkage means are operatively associated with the two first supports, the first ends of the frame, and the slides that automatically pivot the first supports from the first position substantially parallel to the first ends of the frome to second portion where the first support are adjacently positioned when the slides are moved from first positions to second positions by fourth power means. The first supports due to the angular shape thereof move the expandable sheet deflectors upwardly relative to low hanging branches of the tree as they pivot thereunder. A number of second supports are pivotally mounted on the first ends of the frame and are connected to the expandable sheet deflectors. The second supports swing outwardly and upwardly relative to the first ends of the frame in conformity with the pivoting movement of the first supports as the supports move to outwardly extending positions under the branches of a tree. The second support serves to assist the first support in maintaining the expandable sheet deflectors in a fruit and nut receiving position under a tree having low hanging branches.

BRIEF DESCRIPTION OF THE DRAWINGS

FIG. 4 is a transverse cross sectional view of the invention taken on the line 4—4 of FIG. 1, with the shaker and carriage in a retracted position;

FIG. 5 is the same transverse cross sectional view shown in FIG. 4, but with the carriage and shaker having been extended outwardly to a tree trunk engaging position;

FIG. 6 is a fragmentary top plan view of the center portion of the invention illustrating the shaker in engagement with a tree trunk, and the sheet material deflector first supports adjacently disposed to hold the flexible sheet material (not shown) in nut or fruit receiving position as shown in FIG. 2;

FIG. 7 is the same fragmentary plan view shown in FIG. 6, but with the shakers outwardly disposed from the tree trunk, and with the supports having been pivoted to positions substantially parallel with first end portions of the two transverse conveyor belt assembly;

FIG. 18 is a perspective view of the pivotally supported shaker assembly that permits the shakers to removably grip the tree trunk that is angularly disposed relative to the ground surface.

DESCRIPTION OF THE PREFERRED EMBODIMENT

Figure 1:
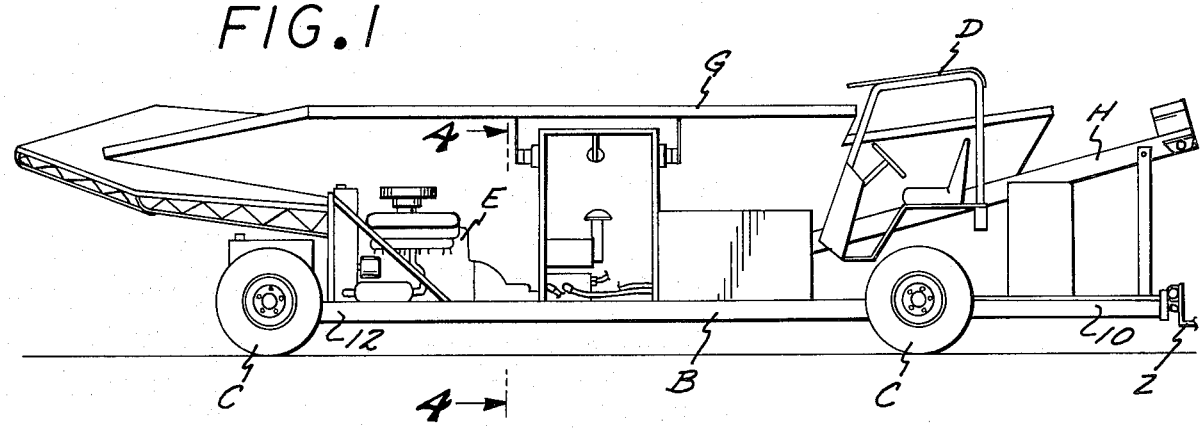
FIG. 1 is a side elevational view illustrating the general arrangement of the invention.

The combined tree shaker and fruit and nut harvesting device A as may best be seen in FIG. 1 includes an elongate chassis B that is supported on at least two pairs of longitudinally spaced, pneumatic-tired wheels C. The chassis B has first and second ends, with a cab D preferably being provided adjacent the first end 10.

The chassis B adjacent the second end 12 thereof supporta a prime mover E that is illustrated as being an internal combustion engine. The wheels C adjacent the second end 12 of the chassis are guidable by a steering mechanism F of conventional design that is manually operable from the cab D. The prime mover E by transmission means (not shown) of a conventional nature, are adapted to drive at least the wheel C adjacent the first end 10 of the chassis, to move the chassis longitudinally along a space defined by the trees that have the trunks thereof arranged in rows.

A longitudinally extending fruit deflector G is supported from the chassis B by a number of uprights G-1 that extend upwardly from the chassis B. The deflector G is formed from a sufficiently rigid material as to be dimensionally stable, and is positioned sufficiently low on the chassis as to be disposed under the major portions of the branches of a tree (not shown) when the device A is moved opposite thereto. From experience, it has been found that fruit such as peaches and the like are not damaged when they fall from the tree onto the deflector G, even though the deflector G is relatively rigid. The chassis B movably supports a first longidutinally extending fruit conveyor means H as may best be seen in FIG. 1, which conveyor means includes a portion that extends upwardly towards the first end 10 of the chassis. The chassis B also supports two laterally spaced, L-shaped uprights J as can best be seen in FIG. 5, and these uprights in turn pivotally support a pair of transverse rails K. The rails K movably support a carriage L best seen in FIGS. 4 and 5, with the carriage supporting two transverse laterally spaced endless belt conveyor assemblies M. The carriage L also between the conveyor assemblies M pivotally support two power driven shakers N which when the carriage L is in the second position shown in FIG. 6, may removably engage opposite sides of a tree trunk O.

First power means P are provided as may best be seen in FIG. 6, for concurrently moving carriage L, transverse conveyors M, and shakers N transversely on the chassis B from the first position shown in FIG. 4 to the second position shown in FIG. 5. Second power means Q are also provided on the chassis B for pivoting the rails K to allow the shakers N to grip the trunk O at a desired elevation when the carriage L is in the second position illustrated in FIG. 6. Third power means are also provided on the device A for moving the shakers N towards and away from one another to grip the trunk O with a desired degree of intensity when the carriage L is in the second position shown in FIG. 6.

Figure 2:
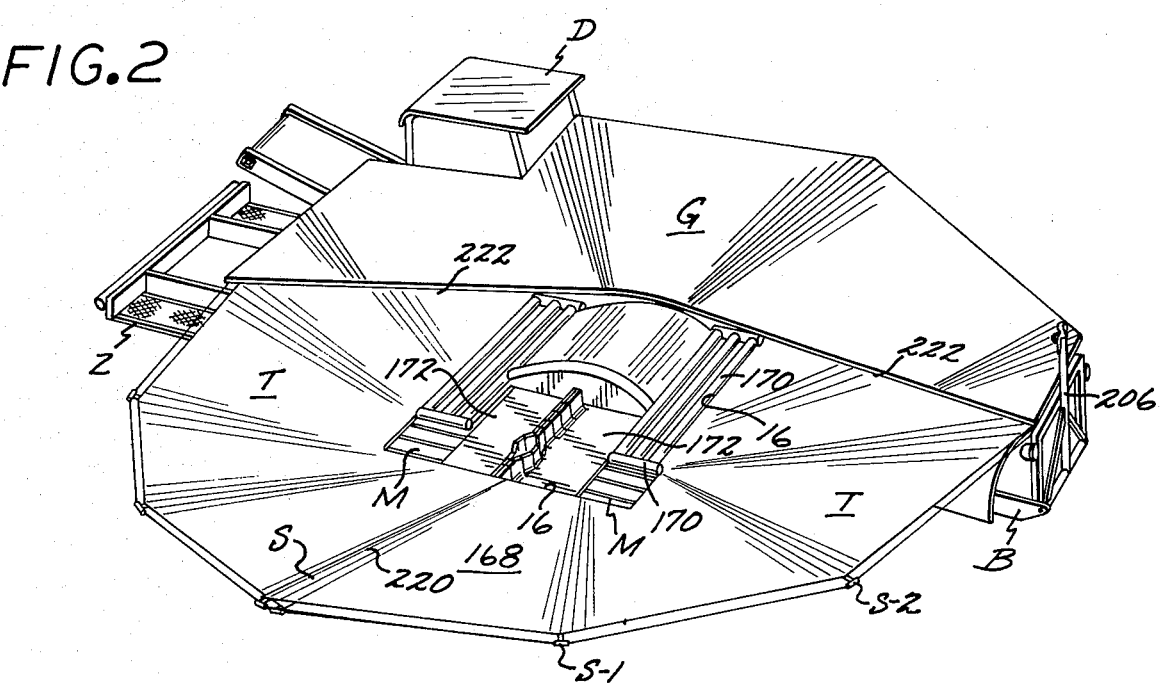
FIG. 2 is a perspective view of the invention with the sheet deflectors extended to a nut or fruit receiving position.

Two sets of elongate supports S are pivotally mounted on the conveyors M adjacent the shakers N, and these supports having pliable sheets T secured thereto as shown in FIG. 2 that may be expanded to extend under the branches of the tree that has the trunk O thereof engaged by the shakers N.

The deflector G and deflector sheets T when fully expanded to provide a continuous surface and having an opening 16 in the center thereof. The upper surface of the deflector G and deflector sheets T when expanded as shown in FIG. 2 slope downwardly and inwardly to cause fruit and nuts (not shown) deposited thereon to roll downwardly by gravity onto the transverse conveyors M. Power means U are provided on the chassis for driving the conveyor H and transverse conveyors M, to transport fruit (not shown) deposited on the transverse conveyors upwardly thereon to positions above the conveyor means H, with the fruit dropping onto the conveyor means H, and being transported thereby toward the first end 10 of the chassis B.

The chassis B as may best be seen in FIGS. 4, 5 and 6 is defined by two laterally, spaced parallel structural members 18 which are illustrated as being of channel shaped cross section. The pneumatic-tired wheels C are connected to the chassis C by conventional means (not shown). The members 18 towards the first end 10 of the chassis have two laterally spaced, parallel structural members 20 extending upwardly therefrom. The members 18 and 20 serve to rotatably support a number of transversely positioned longitudinally spaced rollers 22 as may best be seen in FIGS. 4 and 5 and these rollers serving to rotatably support an endless conveyor belt 24 that has spaced transverse cleats 26 extending outwardly from the exterior surface thereof.

The members 20 at their junction with the members 18 extend inwardly over the conveyor belt 24 to prevent it being dislodged from the rollers, as the belt angles upwardly towards the first end 10 of the chassis. A hydraulic motor (not shown) is mounted on the free extremity of one of the members 20, and is connected to one of the rollers 22 by conventional means (not shown) to drive the same. The upper reach of the conveyor belt 24 is driven in a direction so that at all times it moves towards the first end 10 of the chassis B.

Each of the uprights J includes a vertical leg 30 as may best be seen in FIGS. 5 and 6 and a horizontal leg 32 that has the free end thereof secured to one of the chassis members 18 by welding beads 34 or other suitable fastening means. The legs 30 are connected by reinforcing cross piece (not shown). Each of the legs 30 as can best be seen in FIG. 5 serves by a pin 36 to pivotally support one of the rails K. The carriage L as may best be seen in FIGS. 3, 4 and 5 includes a horizontal cross piece 40 that supports a pair of heavy vertical rods 44. The rods 44 are secured to the cross piece 40 by nuts 46 or other fastening means. The cross piece 40 has two pairs of vertical plates 48 and 50 secured thereto that extend downwardly therefrom, with each pair of plates being disposed on opposite sides on one of the rails K. Each of the plates 48 has a number of stub shafts 52 projecting therefrom as shown in FIGS. 4 and 5, and these shafts serving to rotatably support rollers 54 that are situated both above and below one of the rails K. The rollers 54 allow horizontal movement of the carriage L on the rails K, but prevent any appreciable vertical movement of the carriage relative to the rails.

Each of the shakers N as can best be seen in FIGS. 4 to 7 inclusive is supported on an outer end 56 of an upwardly inclined rigid member 58. The plates 50 on the ends thereof most remote from the uprights 30 as may best be seen in FIG. 5 have a horizontal cross piece 49 extending therebetween, which cross piece has a bracket 49a secured thereto. The bracket 49a is secured to the center portion of cross piece 49. Bracket 49a has a pin 49b secured thereto, which pin has the upper end of the vertically disposed length of chain 49c anchored thereto.

The lower end of chain 49c is secured to a transversely positioned elongate rigid box 51 that has first and second plates 51a and 51b affixed to the ends thereof. First plate 51a as may be seen in FIGS. 3, 4 5 and 19 has a stub shaft 53 projecting therefrom that is rotatably supported in a cylindrical bearing 55 that is welded or otherwise secured to a cross piece 57. The cross piece 57 is supported between resilient pads 59 on the lower portions of rods 44, and is prevented from being displaced from the rods by nuts 61 that engage lower threaded end portions of the rods.

Stub shaft 53 has a tapped bore (not shown) extending inwardly from the free end thereof. A washer 63 of greater diameter than the interior of bearing 55 abuts against the free end of the latter. A bolt 65 extends through the washer 63 and engages the tapped bore (not shown) with the washer and bolt cooperating to prevent the first stub shaft 53 being inadvertently displaced from bearing 55.

Second plate 51b as best seen in FIG. 5 has a nut 51c secured thereto. A tubular stub shaft 51d has a first end thereof in abutting contact with second plate 51b. A washer 51e engages a second end of shaft 51d. A bolt 51f extends through the washer 51e and tubular shaft 51d to engage nut 51c. When the bolt 51f is tightened the stub shaft 51d is held in fixed longitudinal alignment with the rigid box 51. A tube 51g is rotatably supported on shaft 51d between washer 51e and second plate 51b. Tube 51g has two parallel elongate members 51f secured to the top and bottom thereof as best seen in FIG. 19. The members 51f have two vertically disposed pins 51g extending between the ends thereof as may be seen in FIG. 18, which pins pivotally support end sections 58a of members 58. The end sections 58a are angularly disposed relative to the balance of the members. The cross piece 49 supports two spaced downturned L-shaped members 49d that have the lower ends thereof secured to a longitudinally extending channel iron 62.

Figure 3:
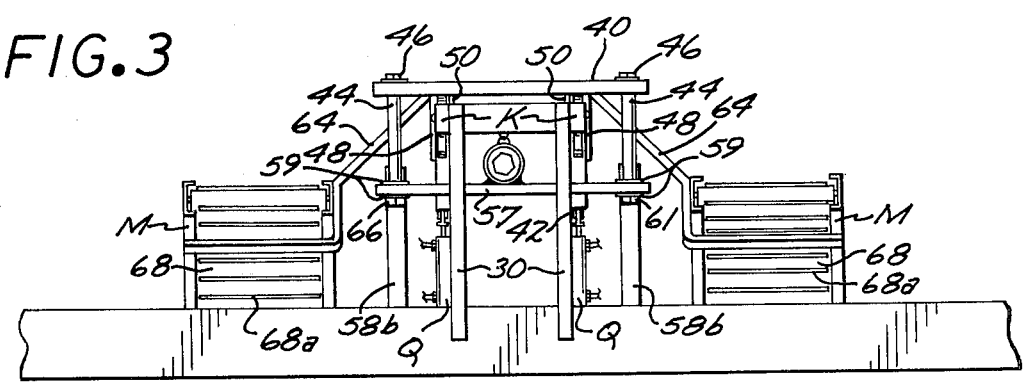
FIG. 3 is a fragmentary side elevational view of a center portion of the invention.

The carriage L has two arms 64 extending outwardly in opposite directions from the plates 48, and these arms in cooperation with the channel iron 62 serving to support the two conveyor assemblies M as best seen in FIG. 3.

Each of the conveyors M is defined by two elongate laterally spaced transverse rigid frame members 66 that are held in fixed positions by the arms 64 and channel iron 62. The members 66 rotatably support a number of spaced cylindrical rollers thereon (not shown) on which an endless belt 68 is mounted. Each of the belts 68 has number of cleats 68a that extend outwardly from the exterior surface thereof, and serve to move fruit deposited on the belt upwardly towards the conveyor means H. The conveyors M at all times have portions thereof that are situated above the conveyor means H and below the first deflector G as may be seen in FIG. 1. Each of the conveyors M is provided with a hydraulic motor 72 shown in FIG. 1 that by a transmission 74 drives the belts 68 in a direction to deposit fruit on the conveyor means H when the carriage is in the second position shown in FIG. 10. The members 66 support longitudinally extending ends 67.

The first power means P as may best be seen in FIG. 5, 6 and 7 is used for moving the carriage L, conveyors M, and shakers N transversely as a unit relative to the chassis B.

The rails K have lugs 96 projecting downwardly therefrom. The second power means Q as shown in FIGS. 3 and 5 include two hydraulic cylinders 96' that have the lower ends thereof pivotally connected by pins 98 to lugs 100 that extend outwardly from the chassis B. The cylinders 96' have piston rods 102 extending upwardly therefrom that are pivotally connected to pins 104 that extend through pairs of spaced lugs 106 that project downwardly from the rails K. Hydraulic fluid may be discharged inot and out of the hydraulic cylinder 96' concurrently through connections 108 and 110 to move the piston rods 102 upwardly and downwardly in unison relative to the chassis B. Such movement of the piston rods 102 results in pivotal movement of the rails K, and as the carriage L is moved on the rails, the shakers N and the outwardly disposed ends of the conveyors M may be positioned at a desired elevation relative to the trunk O of the tree that is to have fruit shaken therefrom.

Figure 9:
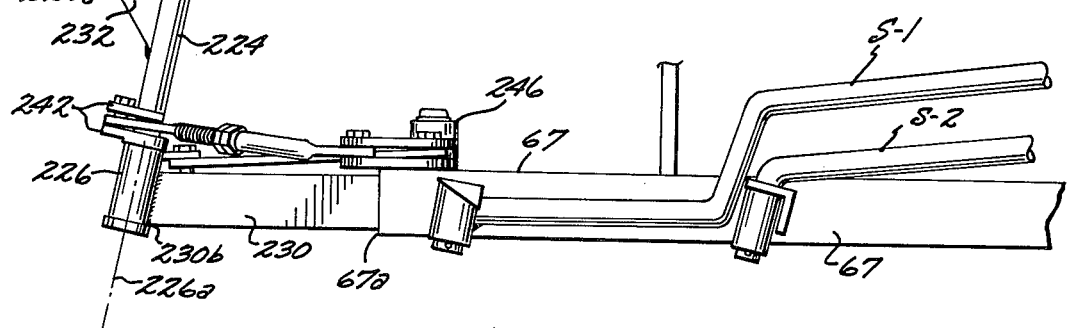
FIG. 9 is a side elevational view of the assembly shown in FIG. 8.

Third power operated means R are provided in the form of a hydraulic cylinder 112 as can best be seen in FIG. 9 that has a first end thereof pivotally connected by a pin 114 to two spaced lugs 116 that project outwardly from one of the members 58. The cylinder 112 slidably supports a piston rod 118 that has the free end thereof pivotally connected by a pin 120 to the one of the members 58 that does not have the lugs 116 mounted thereon. Hydraulic fluid under pressure may be discharged into and out of the hydraulic cylinder 112 through connection 122 and 124 to pivot members 58 and shakers N supported thereon either towards or away from one another. By pivoting the members 58 towards one another, the shakers N may be urged into gripping contact with opposite sides of trunk O as shown in FIG. 6. The shakers N may be of a variety of designs, but as illustrated in the drawings, each include a hollow box 126 that has two shafts 128 and 130 rotatably supported thereon, with the shaft 128 supporting an eccentrically mounted weight (not shown). The shafts are provided with pulleys 128a and 130a that are engaged by an endless belt 132. When shaft 130 is driven by a motor (not shown), the shaft 128 and eccentric weight (not shown) are rotated, the shakers N impart a strong vibrating movement to resilient pads 134 as shown in FIG. 6, that are in pressure contact with the trunk O.

Two elongate first supports S of angular shape are secured to first free edges 220 of the expandable deflector sheets T, with second free edges 222 being secured to the fixed deflector G as shown in FIG. 2. Each first support S includes a lower straight portion 224 that is journalled in a cup shaped bearing 226 that is secured to a first end portion 228 of a slide 230. Each slide 230 is longitudinally movable in one of the ends 67. Each end 67 is of tubular construction. Each bearing 226 has a longitudinal axis 226a that extends upwardly and inwardly towards the slide 230 to which the bearing is secured as shown in FIG. 9. First portion 224 has a second portion 224a projecting outwardly therefrom and substantially normal thereto. The second portion 224a develops into an upwardly extending, angularly positioned third portion 224b, as may best be seen in FIG. 9. A reinforcing web preferably extends between each first and second portion 224 and 224a.

Figure 8:
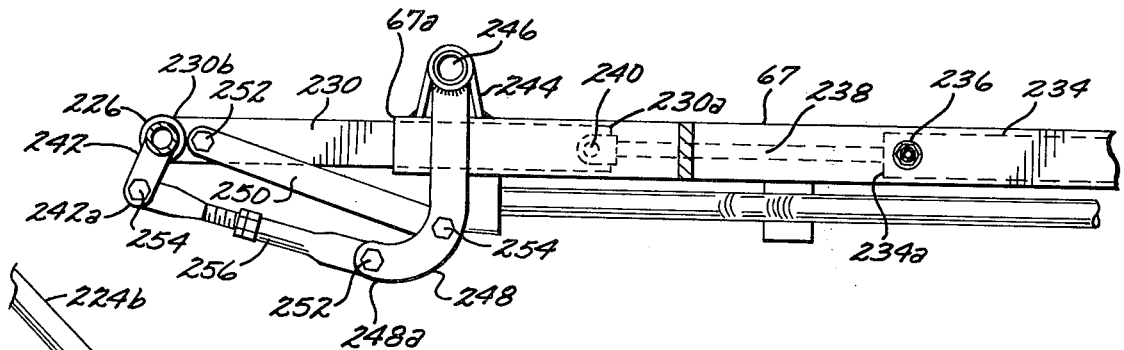
FIG. 8 is a fragmentary top plan view of a first end of one of one of the frames that supports a second conveyor belt assembly, and illustrating the linkage mechanism used in pivoting a first of the supports secured to the sheet material deflector to a position to hold the deflector in a fruit or nut receiving position.
Figure 10:
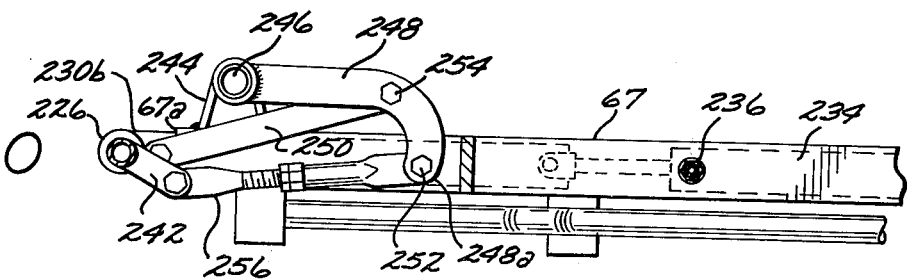
FIG. 10 is the same plan view as shown in FIG. 8, but with the first support having been pivoted to a position where it is substantially parallel to the first end of the frame that supports the second conveyor assembly with which it is associated.
Figure 11:
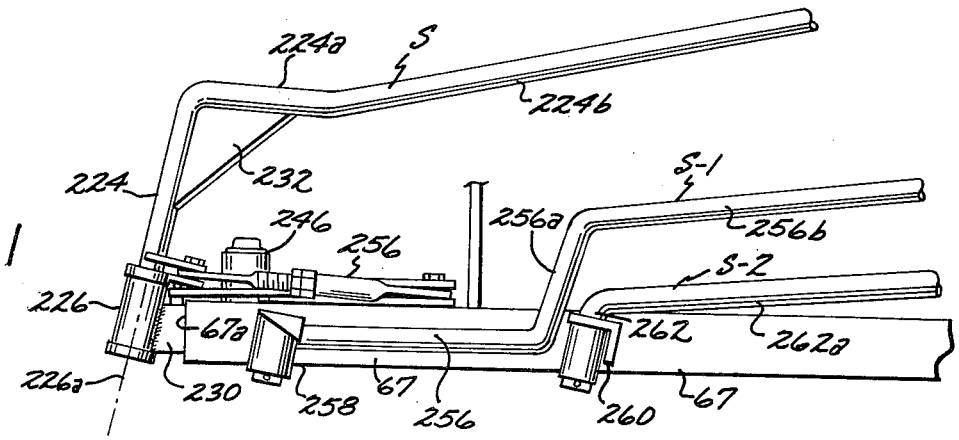
FIG. 11 is a side elevational view of the mechanism shown in FIG. 10 and illustrating the position of one of the first supports, and also two pivotally mounted second supports that are secured to the sheet material deflector, which sheet material expanded and contracted by pivotal movement of the first support.

Each of the ends 67 has a hydraulic cylinder 234 rigidly secured to the interior thereof as best seen in FIGS. 8 and 10 by a bolt or other fastening means 236. The first end 234a of the hydraulic cylinder is situated longitudinally a substantial distance from the free end 67a of the end 67 on which it is mounted. Hydraulic fluid under pressure may be discharged into and out of the cylinder 234 by conventional means (not shown), to move a piston rod 238 longitudinally within one of the ends 67. Each piston rod 238 on a free end thereof is connected by a transverse pin 240 to a first end 230a of one of the slides 230. The slides 230 on second ends 230b thereof support cup shaped bearing 236 as shown in FIGS. 9 and 11.

The first portion 224 of each support S as can be seen in FIG. 9 has a pair of spaced lugs 242 projecting outwardly therefrom. Each of the ends 67 adjacent the first end 67a thereof has a cup shaped bearing 244 secured thereto that rotatably supports a short upwardly extending stub shaft 246, which shaft has two vertically aligned arms 248 extending outwardly therefrom. The arms 248 are of a roughly J-shaped configuration.

A first rigid link 250 best seen in FIG. 8 has a first end thereof pivotally connected by a pin 252 to the slide 230 associated therewith, and the second end of the first link 250 being pivotally connected by a pin 254 to the arms 248. The first ends 248a of the arms 248 and first ends 242a of lugs 242 have pins 252 and 254 extending transversely therethrough, and the pins 252 and 254 pivotally connected to a telescopically adjustable second link 256. When the link mechanism above described is in the position shown in FIG. 8, the second link 256 properly adjusted as to length, it will be seen that the supports S may be pivoted to outwardly extending positions as shown in FIG. 6 where they overlap one another andhold the two sheet deflectors T in downwardly tapering positions as illustrated in FIG. 2. When the expanded sheet deflectors T are so disposed fruit or nuts (not shown) falling thereon will roll by gravity to the conveyor mechanism M for subsequent movement to the conveyor H. When it is desired to place the expanded deflectors in positions where they are substantially parallel to the chassis B of the invention A, the hydraulic cylinders 234 are energized, with the linkage mechanism previously described now assuming the configurations shown in FIG. 10. Each of the ends 67 also has a number of second supports S-1 and S-2 pivotally mounted thereon, and the second supports like the first supports S being rigidly secured to one of the sheets 68. As the supports S are pivoted as previously described, the second supports S-1 and S-2 will move in conformity therewith due to all of the supports being connected to the sheets 168.

Each support S-1 includes a first portion 256 that by bearing means 258 is pivotally supported from one of the ends 67 adjacent the first end 67a thereof, with the first portion 256 developing on the free end thereof into an upwardly extending second portion 256a. Each second portion 256 on the upper extremity thereof as viewed in FIGS. 9 and 11 merges into an upwardly inclined third portion 256b. Each second support S-2 as best seen in FIGS. 9 and 11 is supported from one of the ends 67 by a bearing assembly 260. Each bearing assembly 260 pivotally supports a first portion 262 of one of the second supports S-2 and this portion developing into a second portion 262a as shown in FIG. 9 and 11 that is disposed at a slight upwardly extending angle relative to the end 67 with which it is associated. It will be particularly noted in FIGS. 8 and 10, that as the slides 67 are moved towards one another after they have been disposed under the branches of a tree (not shown), that this inward movement of the slides automatically causes the first supports S to pivot to an upwardly extending positions under the branches of the tree. Due to the substantial spacing of the slides 230 when in the position shown in FIG. 7, a relatively wide space is provided between the ends 67 to permit the carriage L and shakers N to move transversely prior to the shakers being placed in gripping contact with the trunk O of a tree as illustrated in FIG. 6.

It will be noted that as the first supports S pivot from the position shown in FIG. 11 they initially swing under low overhanging branches of a tree (not shown) and then the third portions 224 into upwardly inclined positions as the linkage mechanism moves the supports to the expanded sheet material 168 holding positions illustrated in FIGS. 2 and 9.

The carriage L as such movement of the supports S, S-1 and S-2 takes place moves transversely on the rails K, which rails include first portions K-1 and second portions K-2 illustrated in FIG. 4 that are angularly disposed relative to one another.

When the carriage L is in the retracted position shown in FIG. 4 it will be noted that the rollers 54 are situated above and below the first and second portions K-1 and K-2 of the rails K. As outward transverse movement of the carriage L takes place, the carriage and the shakers N supported therefrom are tilted downwardly until such time as the rollers 54 situated under the first portions K-1 of the rails have passed to the first portions K-2. The carriage L thereafter continues to move outwardly from the invention, but downwardly at a lesser rate due to both sets of the rollers 52 being in contact with the second portions K-2 of the rails K. This construction facilitates the movement of the shakers N under low hanging branches of a tree to permit the shakers to be disposed in gripping contact with the trunk of the tree as shown in FIG. 6.

Due to the pivotal support for the shakers N as shown in FIG. 18, the shakers are capable of gripping a tree trunk O that has grown at an angle relative to the ground surface on which the invention is supported.

Figure 12:
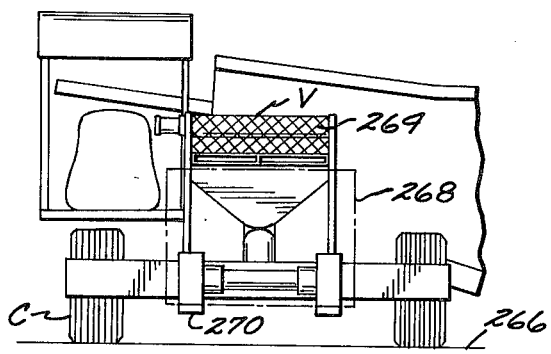
FIG. 12 is an end elevational view of the harvester showing a box supported in phantom line therefrom, and illustrating a conveyor assembly that sizes the fruit prior to it dropping downwardly therefrom into the box shown in phantom line.
Figure 13:
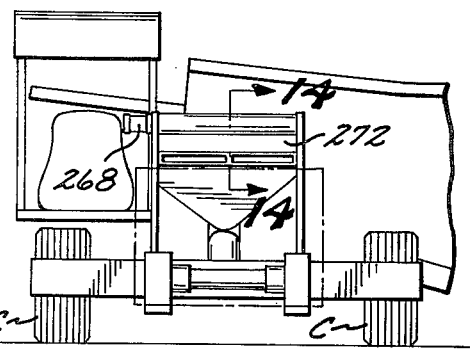
FIG. 13 is the same end view as shown in FIG. 12 but illustrating that the sizing conveyor may have a cleated resilient belt frictionally mounted thereon to permit the harvester to deliver nuts to the box without the nuts being sized.
Figure 14:
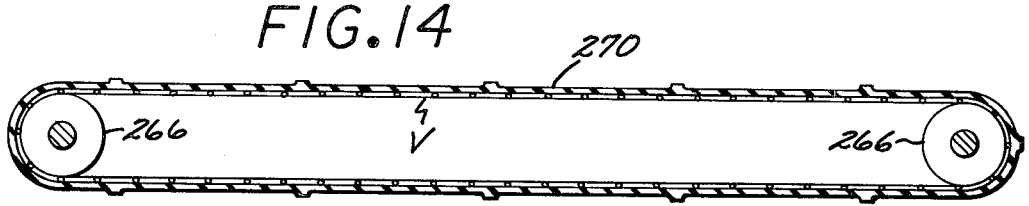
FIG. 14 is a longitudinal cross sectional view of the sizer belt, with a second cleated belt mounted thereon, and the second belt being used to transport harvested nuts to a position where they will drop by gravity into a box shown in phantom line in FIG. 13.

The invention A is susceptible to numerous modifications to adapt it to the harvesting of both nuts and fruit of trees by shaking the latter. In FIG. 12, the first end portion of the invention A is shown with a power driven sizer conveyor V mounted thereon to receive fruit from the conveyor H, and fruit of undersize dropping through openings 264 formed in the belt onto the ground surface 266. The sizer belt V as can best be seen in FIG. 14 is movably supported on two longitudinally spaced transverse rollers 266 one at least of which is driven by power means 268 shown in FIG. 13. The sized fruit (not shown) is charged from the sizer belt V drops into a box 268 shown in phantom line in FIG. 12 that is removably supported on a set of forks 270 that is removably supported on a set of forks 270 that are secured to the first end 10 of the harvester A or vertically movable thereon by power means (not shown). When it is desired to harvest nuts and not size the nuts, an elongate resilient belt 272 may be mounted in frictional pressure contact with the sizer belt V to overlie the same, and the belt 272 then permitting nuts to be delivered to the box 268 without the nuts being sized.

The invention A may be modified if desired to have the first end 10 of the chassis extend outwardly from the cab D a substantial distance, and this first end 10 having a trailer hitch assembly 272 so supported therefrom that a trailer 274 may be drawn by the invention as the latter moves downwardly in the space between two rows of trees.

When the invention A is so modified, a conveyor assembly 276 is provided that has a rectangular frame 278 that supports an endless conveyor belt (not shown) that receives fruit and nuts from the conveyor H and delivers the same rearwardly to an elevated position above the trailer 274, with the nuts discharging downwardly by gravity from this position into the trailer. The conveyor assembly 276 is supported in an upwardly and rearwardly extending position into the trailer. The conveyor assembly 276 is supported in an upwardly and rearwardly extending position by a pair of supports 280 that are secured to the chassis B by bolts 282 or other fastening means, and brackets 284 on the forward end of the conveyor assembly 278 that are secured to the side portions of the conveyor assembly H by bolts 286 or the like. This form of the invention is particularly adapted for the harvesting of nuts.

Figure 15:
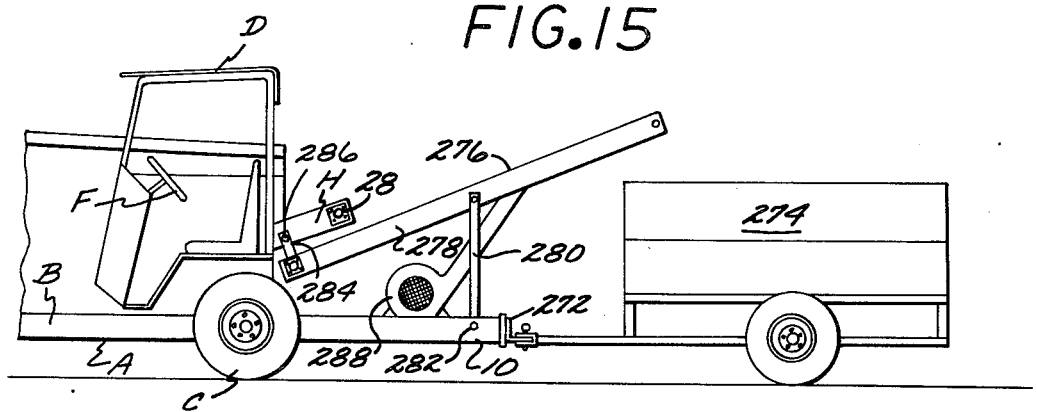
FIG. 15 is a side elevational view of a modified form of a harvester, wherein a trailer is utilized as the container to receive the harvested fruit or nuts, and an upwardly and rearwardly extending power driven conveyor being mounted on the invention to receive nuts or fruit from the longitudinally extending conveyor and transfer this matter to an elevated position where it may drop into the trailer.

It will be noted in FIG. 15 that a blower assembly 288 is mounted adjacent the conveyor assembly 276 and directs a current of air thereon to flow foreign material such as leaves and the like from the conveyor, rather than have this foreign material delivered into the trailer 274 with the nuts that are being harvested.

Figure 16:
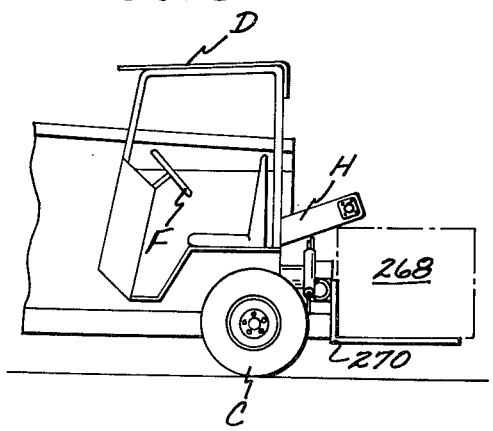
FIG. 16 is a side elevational view of a modified form of the invention wherein a pivotally supported fork is mounted on the first end of the chassis to support a box that receives nuts or fruit from the longitudinally extending conveyor on the chassis of the invention.
Figure 17:
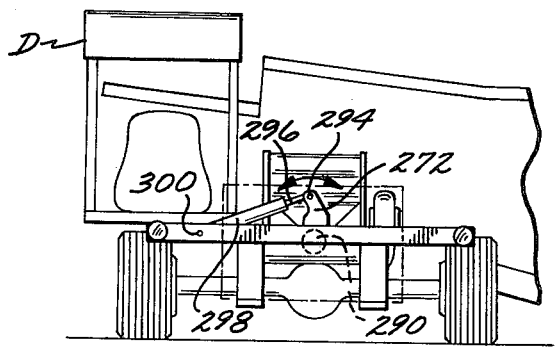
FIG. 17 is an end elevational view of the device shown in FIG. 16 and illustrating the means by which the fork supporting the box may be pivoted transversely relative to the chassis by power means.

Another modification of the invention is shown in FIGS. 16 and 17, in which a fork support 270 is pivotally supported from a longitudinally extending shaft 290 that has an arm 292 rigidly secured and extending upwardly therefrom, which arm is pivotally connected by a pin 294 to piston rod 296. The piston rod is slidably movable on a hydraulic cylinder 298 that is pivotally connected by a pin 300 to a transverse portion of the chassis B. By actuating the hydraulic cylinder the fork 270 supporting the bos 268 may be pivoted transversely in either direction as indicated by the arrows in FIG. 17, and this pivotal movement taking place as fruit or nuts discharge from the conveyor H. The improvement previously described in detail, provides an improved fruit and nut harvester that is easier to manipulate into a harvesting position than the device disclosed in my previous patent and one in which the carriage and the shaker members may be manipulated at a low elevation to permit the shakers to engage a portion of the trunk O of a tree that has low overhanging branches. Not only may the shaker N be so moved but the support S will likewise move at a low elevation to the ground to permit the shaker to slip under low overhanging branches prior to them being expanded to the nut and fruit receiving positons illustrated in FIG. 2.

The conveyors M as may best be seen in FIGS. 1 and 2 have a number of elongate tubes or bars 170 supported thereabove, which bars are so laterally spaced that fruit rolling onto them from the deflector G or sheets 168 is slowed down as it passes between the spaces and drops to the conveyor M. The tubes or bars 170 are held in laterally spaced relationship by cross pieces 172, which cross pieces are secured to the conveyors M by conventional means (not shown). Although but one set of tubes or bars 170 is shown in FIG. 2, in practice several layers of the bars may be so arranged that fruit (not shown) rolling by gravity from the sheets T thereon pass between the tubes 170 at a relatively constant rate rather than being dropped onto the conveyor M in groups or bunches.

The members 58 that support the shakers N have deformable heavy rubber sheets 172 or the like mounted thereon as shown in FIGS. 1 and 2, and these sheets assuming the configuration shown in FIG. 2, when the carriage L is in the second position. The sheets 172 when in the position shown in FIG. 2 slope towards the conveyors M, so that fruit dropping onto the sheets will roll by gravity to the conveyors. The conveyors M also have an inverted arch shaped sheet 174 of rubber or the like extending therebetween, and this sheet due to the convex upper surface thereof directing fruit falling thereon to the tubes or bars 170. Both the deflector G, and the sheets 168 when they are in the expanded position shown in FIG. 2 have all upper surface portions thereof sloping towards the conveyors M, so that fruit falling onto the deflector or sheets will roll by gravity towards the conveyors.

The use and operation of the improved invention has been explained previously in detail and need not be repeated.

I claim:

1. A device that may be moved longitudinally along a space between trees that have the trunks thereof arranged in rows to sequentially subject each of said trees including those with low hanging branches on one side of said space to a shaking operation to displace fruit or nuts therefrom, to harvest said fruit or nuts, and to deliver said fruit or nuts to a container that travels with said device, said device being of the type that includes an elongate, power driven, wheel supported, manually guidable chassis having first and second ends; an elongate dimensionally stable first fruit and nut deflector longitudinally supported on said chassis and extending under a portion of the branches of a tree when said chassis is in a harvesting position relative thereto; a first longitudinal conveyor belt assembly supported on said chassis under said deflector; a transversely movable carriage disposed between said deflector and said first conveyor belt assembly, said carriage capable of occupying either first or second positions, said carriage when in said first position extending across said first conveyor belt assembly and said carriage when in said second position extending from said first conveyor belt assembly towards said tree that is to be harvested; two longitudinally spaced, transverse elonge rigid members having first and second ends, said first ends pivotally connected to said carriage; two power operated tree shakers supported from said second ends of said members; two longitudinally spaced transverse frames supported from said carriage with said two members situated therebetween, with the longitudinal spacing between said frames being such that said members and tree shakers may be disposed to angle away from one another when said shakers are not in a tree trunk engaging position, and said frames having outwardly disposed longitudinally extending first ends, two second conveyor belt assemblies supported in said frames; first power means for moving said carriage between said first and second position; second power means for pivoting said elongate members towards one another to dispose said tree shakers in gripping pressure contact with the trunk of a tree; third power means for driving said first and second conveyor belt assemblies; two expandable sheet deflectors that may be extended under a tree to cooperate with said first deflector to receive nuts and fruit shaken from a tree, said first deflector and sheet deflectors when expanded defining fruit and nut receiving surfaces that slope towards said second conveyor belt assemblies whereby fruit or nuts falling on said surfaces roll by gravity thereon to said second conveyor belt assemblies to be transported to said first conveyor belt assembly towards said first end of said chassis to be delivered to said container, the improvement for so supporting said two expandable sheet deflectors that they can be extended under trees with low hanging branches to receive fruit and nuts therefrom when said shakers are actuated, said improvement comprising:

a. two transverse, longitudinally spaced rails supported from said chassis above said first conveyor belt assembly, said rails having upwardly inclined first portions above said first conveyor belt assembly and downwardly inclined second portions;

b. roller means on said carriage that movably engage said rails and on at least a portion of the journey from said first to said second position are in engagement with both said first and second portions to cause said shakers as they initially move transversely relative to said chassis to move downwardly at a substantial angle to pass under low overhanging branches of a tree and as said journey continues for said shakers to move downwardly but at a less angle as said roller means rest entirely on said second portions;

c. two slides movably supported from said first ends of said frames;

d. fourth power means for concurrently moving said slides towards and away from one another;

e. two elongate first supports of angular shape pivotally mounted on said slides, said first supports having free edges of said expandable sheet deflectors secured thereto;

f. linkage means operatively associated with said first supports and said first ends of said frames that automatically pivot said first supports from first positions substantially parallel to said first ends of said frames to second positions where said first supports are adjacently disposed when said slides are moved from first positions to second positions by said fourth power means, with said first supports due to the angular shape thereof moving said expandable sheet deflectors upwardly relative to branches of a tree when they move about the trunk of said tree; and g. a plurality of second supports pivotally supported from said first ends of said frames that are connected to said expandable sheet deflectors and swing outwardly and inwardly relative to said first ends of said frames in conformity with the pivoting movement of said first supports, said second supports serving to assist said first supports in maintaining said expandable sheet deflectors in a fruit and nut receiving position.

2. A device as defined in claim 1 in which said container is a box, and said device in addition including:

h. a pivotal support for said box on said first end of said chassis and disposed below said first end of said first conveyor belt assembly; and i. fifth power means for pivoting said support and box transversely relative to said first end of said chassis as fruit or nuts discharge into said box from said first end of said first conveyor belt assembly.

3. A device as defined in claim 1 which in addition includes:

h. a power driven third conveyor belt assembly supported from said chassis to receive fruit from said first conveyor belt assembly, said third conveyor belt having a plurality of openings therein to size fruit delivered thereto, with the sized fruit being delivered by said third conveyor belt to said container; and i. a fourth endless belt having longitudinally spaced transverse upwardly extending cleats thereon, said fourth belt capable of being removably mounted on said third conveyor belt to frictionally engage the latter and permit fruit and nuts that have not been sized to be delivered to said container.

4. A device as defined in claim 1 in which said container is a trailer that is connected to said first end of said chassis, and said device including:

h. a power driven third conveyor belt assembly supported from said chassis to receive fruit and nuts from said first end of said first conveyor belt assembly and to deliver said fruit and nuts to the interior of said trailer.

5. A device as defined in claim 1 in which said linkage means are:

h. two lugs rigidly connected to said supports;

i. two arms pivotally supported from said first ends;

j. two first links pivotally connected to said slides and to said arms; and k. two second links pivotally connected to said lugs and arms.

6. A device as defined in claim 5 in which said second links are manually adjustable in length to control the pivotal movement of said two first supports.

7. A device as defined in claim 1 which in addition includes:

h. fifth means for so supporting said members and shakers from said carriage that said members and shakers may not only pivot towards and away from one another but also pivot on an axis normal to said chassis to permit said shakers to engage a tree trunk that is angularly disposed relative to the ground surface.

* * * * *